May 13, 1941.  W. E. MAHER  2,241,953
DUMPING APPARATUS
Filed Nov. 3, 1939  2 Sheets-Sheet 1

INVENTOR:
William E. Maher.
BY David E. Carlsen
ATTORNEY.

May 13, 1941.   W. E. MAHER   2,241,953
DUMPING APPARATUS
Filed Nov. 3, 1939   2 Sheets-Sheet 2
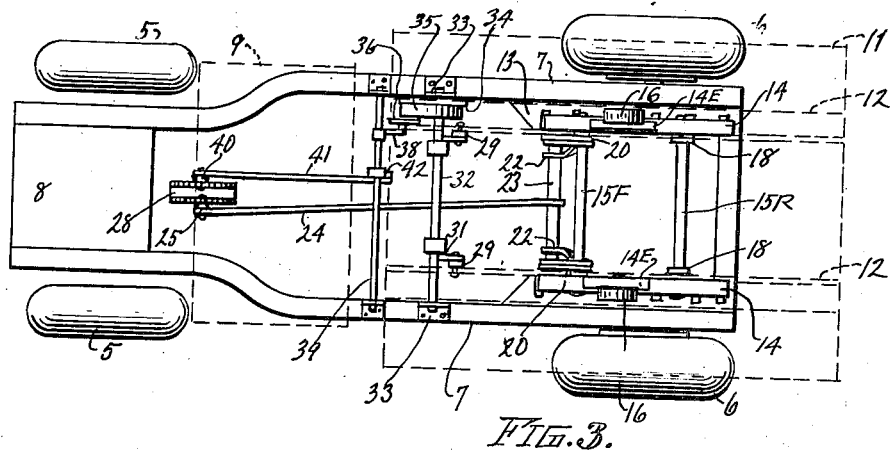
FIG. 3.
FIG. 4.
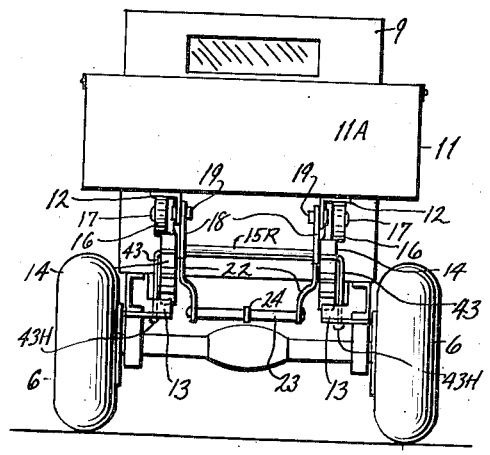
INVENTOR:
William E. Maher.
BY David E. Carlsen
ATTORNEY.

Patented May 13, 1941

2,241,953

UNITED STATES PATENT OFFICE 2,241,953

DUMPING APPARATUS

William E. Maher, St. Paul, Minn.

Application November 3, 1939, Serial No. 302,695

4 Claims. (Cl. 298—14)

This invention relates to improvements in dumping apparatus as applied particularly to motor vehicles and wagons known as dump trucks.

An object is to provide a simple and highly efficient dump truck the operation and control of which is preferably done from and within the driver's cab or in other words at the driver's seat and by manually operable means. The construction and operation of this improved dump truck is such that it is possible and practical to apply and operate considerably larger capacity trucks than has hitherto been accomplished, so far as I am aware, entirely by manually operated means.

A feature in the construction and operation of my improved dump truck lies in the unique dump body mounting and manipulation thereof to dumping position. Other features and objects are hereinafter fully set forth reference being had to the accompanying drawings in which—

Fig. 3 is a top view of Fig. 1, showing the dump-body and cab of the truck in dotted lines only to more clearly reveal the operating mechanisms.

Fig. 4 is a rear view of a truck embodying my improvement, or a right hand end view of Fig. 1.

Figures 1, 2:
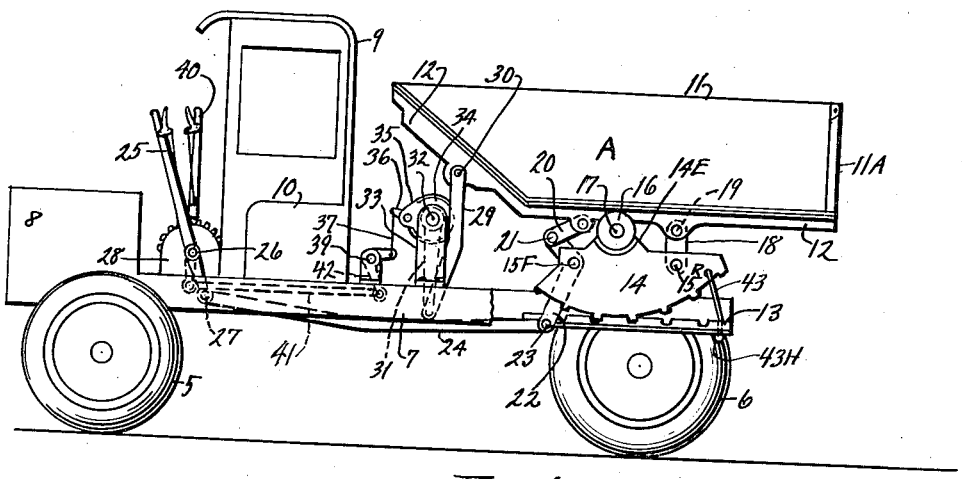
Fig. 1 is a side elevation of a motor truck embodying my invention, parts of the truck frame broken away.
Fig. 2 is a side elevation corresponding to Fig. 1 but showing the dump-body in discharging position.

Referring to the drawings by reference numerals, like characters designate corresponding parts in the various views, I have illustrated my device as embodied on a motor truck, of which 5 are the front wheels, 6 the rear (drive) wheels, 7 the main frame, 8 the motor housing, and 9 the driver's cab with seat 10.

11 designates any suitable type of dump-body, shown as a metal body extending rearwardly from the cab, parallel to and over the main frame and being normally, for load conveying purposes, in the horizontal position shown in Figs. 1 and 4, the rear end of the body usually extending rearward of the truck frame. 11A (in Figs. 1 and 4) designates the usual tail-gate.

12 designates a pair of parallel angle-iron rails extending longitudinally and secured to the under side of the body 11.

For hauling purposes the body 11 is of course in horizontal plane parallel to and over the truck frame 7 at a predetermined height and supported by the following means—

13 is a pair of rack bars fixed one at the inner side of each truck frame member 7 approximately centrally over the rear wheel axle, the toothed part of each said bar being lateral to and inwardly of its member 7.

14 is a pair of rocker members the lower arcuate face of each of which is toothed to mesh in a rack bar 13, said two rocker members registering horizontally and being connected by two transverse bars 15R and 15F of which 15F connects the forward parts and 15R the rear parts. Intermediate the connection bars or shafts (15R and 15F) each rocker is formed with an upwardly directed enlargement or ear 14E each bored to retain the stub shaft 17 of a roller-disk 16, rotatably retained in a plane longitudinal of the body and engaging the rail 12 to support the weight of the body 11.

18 is a link bar (for each rocker) in vertical position when the truck body is in normal carrying position, the lower part of said link pivotally retained on shaft 15R and the upper part pivotally retained at 19 to the downwardly disposed flange of the adjacent rail 12.

20 is a pair of link bars both normally in inclined, forwardly and downwardly directed plane, each pivotally secured to the vertical flange of adjacent rail 12, forward of the roller 16, the lower (front) end of each link 20 pivotally connected at 21 to the outer and forward extremity of an inverted L-shaped (bell) crank 22. Both said bell cranks are pivotally mounted (at their joint) on shaft 15F one adjacent the inner side of the rocker 14, the shorter arms of said bell cranks inclined upwardly and forwardly to connections with link 20, and the longer arm of both said bell cranks in downwardly and forwardly inclined plane, the horizontally (and transversely) registering lower ends of said longer arms rigidly connected by a transverse shaft 23.

24 is a reach rod extending longitudinally forward from shaft 23 under the cab 9 and its forward end connected at 27 to the short arm of an upright hand lever 25 (pivoted on a shaft 26) adjustable to any position relative to a toothed double rack 28.

Manipulation of the hand lever, as will presently be described causes the truck body 11 to be tilted to dumping position shown in Fig. 2 and also replacement of the body to original carrying position.

It must be understood, at this point, that when body 11 is in the normal load carrying position, the proportions and locations of the supporting means and the body itself are such that the center of gravity (or load) of the body is slightly forward of the supporting rollers 16 at which time the links 18 are upright as stated and links 20 inclined as shown.

To rigidly retain the body in said carrying position I provide further a pair of upright link bars 29 each pivotally connected at 30 with its upper end to the flange of rail 12 near the front end of the body, the lower end of both said bars pivotally connected each to the lower extremity of a lever 31 extending down from a transverse shaft 32 journaled in two upright bearings 33 fixed on the main frame 7 of the truck.

Shaft 32 has a brake drum 34 engaged by a friction brake-band 35 contractible by a lever 36 actuated by a rod 37 connected to a lever 38 on another transverse shaft 39. Said latter shaft is oscillatable for brake action by means of another hand lever 40 on shaft 26, the lower arm of which lever (40) is connected by means of a reach rod 41 to a lever 42 on the countershaft 39.

The dumping of the truck body is accomplished as follows, assuming that operating parts are all in the relative positions shown in Fig. 1. In said Fig. 1 A designates center of gravity or load center.

The operator grasps brake lever 40 and releases brake, then grasps lever 25 and pulls it rearwardly, thus pulling reach rod 24 forwardly and likewise the lower arm of bell crank 22. Simultaneously the upper arm of the bell crank pushes link 20 rearwardly with multiplied force moving body 11 (riding on rollers 16) rearwardly until center of gravity is rearward of rollers 16. The same rearward movement causes links 18 to tilt rearwardly and downwardly also causing rear part of truck body to tilt downwardly and the rearwardly and downwardly moving parts involved causes the rockers to tilt rearwardly to the discharging position shown in Fig. 2, the rollers 16 meanwhile maintaining rolling contact with the rails.

Obviously such rearward movement to the discharge position, raises the front end of the body such latter movement bringing the link bars 29 and levers 31 to the positions shown in Fig. 2 in following the movement of the front end of the body. The speed of tilting and discharging movement may of course be controlled by brake lever manipulation directly acting on the front end of the body through levers 31 and links 29.

The dump body is then readily returned to carrying position by first releasing brake. Then lever 25 is pulled rearward, reach rod 24 and bell cranks 22 raising and pulling the body forward until the center of gravity of the body is again over and slightly ahead of the rollers 16. At this time the levers 22 and reach rod 24 are "broken" downwardly below a straight line and lever 25 is pushed forward again to the original position shown in Fig. 1, said latter pushing action of the lever 25 causing reach rod 24 to move rearward and its rear end pushing the lower ends of the bell crank (long arms) rearward below fulcrum 15F thus causing links 20 to pull forward and bring the body 11 forward to position ready for receiving another load. During this replacement of the truck body the rockers 14 are of course rocked back to original position and the links 18 brought back to original upright position supporting the rear part of the body. Then the brake is again set to further hold the body in position.

Obviously the brake can be used to allow the dump body to tilt gradually or even to provide jerky tilting action for purposes well known and including the purpose of providing jerking of the body to loosen all gravel or other substance to be dumped out of the open end of the truck body.

Modifications in details of construction may be embodied including proportions of which no attempt has been made to specify in detail or deemed necessary. It is clear that with proper leverages the manipulation of hand lever 25 provides ample means for initial rearward movement of a heavily loaded body and after movement rearward until the center of gravity is past the supporting rollers the very weight of the body facilitates rearward and downward movement, rocking of the rocker members, and tilting of the body to discharging position.

From experiments made it has been determined that dump truck bodies of heavy capacity can be dumped by the means herein described, thus eliminating the need of any power take-off from the engine of the truck.

43 in Figs. 1, 2 and 4 designates a simple form of device for limiting movement of the rockers, namely a rod pivotally secured with one end in the rear part of the rocker and extending slidably down through an aperture in rack 13 and below the latter formed with a head 43H. Any equivalent thereof may be used.

I claim:

1. In a dumping apparatus including longitudinal main frame members, a dumping body pivotally supported over the frame to tilt and move the body simultaneously, to inclined discharge position; a pair of parallel rails fixed longitudinally to the under side of said body, a rack-rail on each main frame member near the rear end, a pair of rigidly connected and transversely registering rocker members, toothed to mesh with said racks, a roller member in the upper part of each rocker engaging each a rail and supporting the body, a link member rearward of each roller normally in vertical position and pivotally connected to the rocker and to a rail and said links normally vertical to support the body in load carrying position, said body proportioned and positioned for carrying with its center of gravity ahead of said roller supports, lever and reach rod means connected to the front ends of said rockers and arranged to initially move the body rearwardly until its center of gravity is rearward of said rollers and the said link supports thereby tilted rearwardly to initially lower the discharge end of the body and start tilting of the rockers and body rearwardly, simultaneously.

2. The structure specified in claim 1, and a brake mechanism connected to the forward part of the body to control movement of the dump body or hold it in any desired position, said mechanism including a countershaft mounted in spaced relation to the front end of the body, a brake drum on said shaft, a brake band engaging said drum, a lever on said shaft, reach rods connecting said lever and the body and arranged to be expanded or contracted according to movement of the body, and manually operated means to apply or release said brake.

3. In a dump truck comprising a wheel supported main frame including two parallel frame channels, a dump body normally in horizontal position parallel to and over said channels, a pair of rigidly connected rocker members geared to and movable longitudinally in said frame channels, longitudinal rails on the under side of said body, vertically disposed rollers on the said rocker members engaging said rails and supporting the body, auxiliary load supporting means comprising a pair of links connecting the rocker members to the adjacent rails rearward of the rollers, a pair of forwardly and downwardly inclined links the upper ends of which are secured one to each rail forward of the roller, a pair of bell crank levers pivotally mounted on a transverse shaft connecting the forward ends of said rockers, the said bell cranks having each a short arm normally directed in upwardly inclined plane forwardly and its extremity connected to the forward ends of said inclined links, the lower and longer arm of each said bell crank directed in an inclined plane forwardly, manually operatable lever and reach rod means connected to the extremity of both of said lower bell-crank arms to initially tilt the bell cranks and move said inclined links rearwardly to roll the body rearwardly on said rollers, for the purpose set forth.

4. In a dumping device of the class described, a main frame including a pair of parallel rails, a pair of upwardly exposed racks on said rails, a pair of dump-body supporting rocker members each with a toothed arcuate face engaging a rack, a dump-body over said rack members and a pair of longitudinal rails on the under side of said body, a roller rotatably mounted in the upper part of each rocker member and engaging a rail to support the dump body, auxiliary body supporting means comprising tiltable links connecting the upper parts of said rocker members and the underside of the body and positioned rearwardly of and ahead of said roller supporting means, said rocker members adapted to rock on the racks in conformity with the lateral movement of the body, means for moving the body rearward initially on said rollers until the bulk of the load is rearward of said rollers and the body assumes by gravity an inclined discharge position with its rear end in spaced relation rearward of said main frame.

WILLIAM E. MAHER.